(12) United States Patent
Oddo et al.

(10) Patent No.: US 10,565,783 B2
(45) Date of Patent: Feb. 18, 2020

(54) FEDERATED SYSTEM MISSION MANAGEMENT

(71) Applicants: Louis Oddo, Carlsbad, CA (US); Devang R. Parekh, San Diego, CA (US); Henry H. Fung, San Diego, CA (US); Feng Cao, San Diego, CA (US); Michel M. Azar, San Diego, CA (US); Benjamin Montgomery, San Diego, CA (US); Wayne Kim, San Diego, CA (US); Naorus F. Abdulghani, Escondido, CA (US)

(72) Inventors: Louis Oddo, Carlsbad, CA (US); Devang R. Parekh, San Diego, CA (US); Henry H. Fung, San Diego, CA (US); Feng Cao, San Diego, CA (US); Michel M. Azar, San Diego, CA (US); Benjamin Montgomery, San Diego, CA (US); Wayne Kim, San Diego, CA (US); Naorus F. Abdulghani, Escondido, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 358 days.

(21) Appl. No.: 14/992,572

(22) Filed: Jan. 11, 2016

(65) Prior Publication Data
US 2017/0200305 A1 Jul. 13, 2017

(51) Int. Cl.
*G06T 17/00* (2006.01)
*G06F 16/25* (2019.01)

(52) U.S. Cl.
CPC ............ *G06T 17/00* (2013.01); *G06F 16/256* (2019.01)

(58) Field of Classification Search
CPC ...................................................... G06N 5/022
See application file for complete search history.

(56) References Cited

U.S. PATENT DOCUMENTS 6,768,982 B1 * 7/2004 Collins ................. G06N 5/022
706/45
8,331,611 B2 12/2012 Johnson, II et al.
(Continued)

FOREIGN PATENT DOCUMENTS

WO WO 2010/109500 A1 9/2010

OTHER PUBLICATIONS

Parekh, et al.: "*Middleware Abstraction Layer (MAL)*": U.S. Appl. No. 14/989,618, filed Jan. 6, 2016.

*Primary Examiner* — Jitesh Patel
(74) *Attorney, Agent, or Firm* — Tarolli, Sundheim, Covell & Tummino LLP

(57) ABSTRACT

One example includes a federated system manager. Asset adapters receive situational awareness data from a respective plurality of mission assets and convert the situational awareness data into a central data format. Mission constraint adapters receive mission constraint data associated with real-time mission constraints from a respective plurality of mission constraint databases and convert the mission constraint data into the central data format. A mission control adapter receives control data from a mission control station to convert mission control data into the central data format and to provide mission status data to the at least one mission control station for real-time control of the mission. A data model repository maintains a universal data model tracking real-time interactive states of the plurality of mission assets, the real-time mission constraints, and the mission control data. The data model repository also generates the mission status data in real-time based on the universal data model.

20 Claims, 6 Drawing Sheets

(56) References Cited

U.S. PATENT DOCUMENTS

| | | |
|---|---|---|
| 8,358,677 B2 | 1/2013 | Collette et al. |
| 8,558,847 B2 | 10/2013 | Knize et al. |
| 8,933,961 B2 | 1/2015 | McDonald et al. |
| 8,941,677 B1 | 1/2015 | Hallenbeck |
| 2004/0254904 A1* | 12/2004 | Nelken ............... G06F 17/2705 706/50 |
| 2006/0271251 A1 | 11/2006 | Hopkins |
| 2009/0076665 A1* | 3/2009 | Hoisington .......... G05D 1/0044 701/2 |
| 2011/0106338 A1 | 5/2011 | Allis et al. |
| 2012/0072467 A1 | 3/2012 | Kiraly et al. |
| 2013/0021475 A1 | 1/2013 | Canant et al. |
| 2013/0289858 A1 | 10/2013 | Mangiat et al. |

* cited by examiner

| Platform | Simulation Name | VAL Data | HMI POV | Message Type | Rate | Periodic | UAS Standard | Technology/Stack |
|---|---|---|---|---|---|---|---|---|
| Predator/Navy | Vehicle Simulator | ValVehicle | Receive | Position Report | 1Hz | Periodic | STANAG 4586 | JMS/Active MQ |
| | Mission Simulator | ValRoute | Receive | Mission Plan | N/A | Aperiodic (One Time) | STANAG CRD | Data Grid/Active MQ |
| | Footprint Simulator | | Receive | 19001 EO/IR Laser Operating | 10 Hz | Periodic | STANAG 4586 | JMS/Active MQ |
| | Tasking Simulator | ValTarget | Receive | Proprietary | N/A | Aperiodic (One Time) | N/A | JMS/Active MQ |
| | EO/IR Capability | | Send/Receive | 19100 EO/IR Payload Cmd & | | | | |
| | | | | 21101 EO/IR Operating State | N/A | Aperiodic (One Time) | STANAG 4586 | JMS/Active MQ |
| | SAR Capability | | Send/Receive | 19200 SAR Payload Cmd & | | | | |
| | | | | 21100 SAR Operating State | N/A | Aperiodic (One Time) | STANAG 4586 | JMS/Active MQ |
| Global Hawk/Air Force | Vehicle Simulator | ValVehicle | Receive | Position Report | 1Hz | Periodic | UCI/CMS | Data Grid/Active Spaces |
| | Mission Simulator | ValRoute | Receive | Mission Plan | N/A | Aperiodic (One Time) | UCI/CMS | JMS/Active MQ |
| | Tasking Simulator | ValTarget | Receive | Target Tracker Report | N/A | Aperiodic (One Time) | UCI/CMS | JMS/Active MQ |
| | PO Capability | | Send/Receive | EO_IR Cmd & Settings | N/A | Aperiodic (One Time) | UCI/CMS | JMS/Active MQ |
| | SAR Capability | | Send/Receive | SAR Cmd & Status | N/A | Aperiodic (One Time) | UCI/CMS | JMS/Active MQ |
| UCAS-D & Triton/Navy | Vehicle Simulator | ValVehicle | Receive | Position Report | 1Hz | Periodic | UCI | JMS/Active MQ |
| | Mission Simulator | ValRoute | Receive | Mission Plan | N/A | Aperiodic (One Time) | UCI | Data Grid/Active Spaces |
| | Tasking Simulator | ValTarget | Receive | Target Tracker Report | N/A | Aperiodic (One Time) | UCI | JMS/Active MQ |
| | EO/IR Capability | | Send/Receive | EO/IR Sensor Requests & Response | N/A | Aperiodic (One Time) | UCI | JMS/Active MQ |
| | SAR Capability | | Send/Receive | SAR Sensor Requests & Response | N/A | Aperiodic (One Time) | UCI | JMS/Active MQ |
| | Tracks Sim | ValTrack | Receive | Position Report | 1Hz | Periodic | UCI | JMS/Active MQ |
| | Threat Sim | ValThreat | Receive | COB_Record | 0.5 Hz | Periodic | UCI | JMS/Active MQ |
| N/A | No Fly Zone Sim | ValNoFlyZone | Receive | OpZone | N/A | Aperiodic (One Time) | UCI/UCS | Data Grid/ActiveSpaces |

┌─ 452
CONVERT SITUATIONAL AWARENESS DATA RECEIVED VIA A PLURALITY OF ASSET ADAPTERS ASSOCIATED WITH A RESPECTIVE PLURALITY OF MISSION ASSETS IN A GEOGRAPHIC REGION OF INTEREST INTO A CENTRAL DATA FORMAT

┌─ 454
CONVERT GEOGRAPHIC MAP DATA ASSOCIATED WITH THE GEOGRAPHIC REGION OF INTEREST AND PROVIDED VIA A GEOSPATIAL MAP SOFTWARE PROGRAM INTO A GRAPHICAL VIRTUAL ENVIRONMENT IN THE CENTRAL DATA FORMAT VIA A MAP ADAPTER

┌─ 456
MAINTAIN A UNIVERSAL DATA MODEL IN THE CENTRAL DATA FORMAT IN A DATA MODEL REPOSITORY IN RESPONSE TO THE SITUATIONAL AWARENESS DATA

┌─ 458
GENERATE A REAL-TIME THREE-DIMENSIONAL GRAPHICAL RENDERING VIA A PLUG-IN GRAPHICS FRAMEWORK

FIG. 10

FEDERATED SYSTEM MISSION MANAGEMENT

TECHNICAL FIELD

The present invention relates generally to system integration, and specifically to federated system mission management.

BACKGROUND

For many decades, aircraft have been implemented for a variety of uses as means of transportation, reconnaissance, and warfare. As some flight operations became increasingly more dangerous or tedious, unmanned aerial vehicles (UAV) have been developed as a means for replacing pilots in the aircraft for controlling the aircraft. UAVs have become more prevalent in missions, such that missions can typically be performed by a fleet of UAVs. Control of a fleet of UAVs can often require individual remote piloting of the UAVs. However, as processing capability has increased, UAVs can be programmed to perform mission objectives autonomously based on decision-making algorithms and the like. Additionally, for large and/or complex missions, UAVs are combined with other types of vehicles, both manned and unmanned, for performance of a given set of mission objectives. Thus, large federated systems across a variety of platforms can cooperate to perform the mission objectives.

SUMMARY

One example includes a federated system manager. Asset adapters receive situational awareness data from a respective plurality of mission assets and convert the situational awareness data into a central data format. Mission constraint adapters receive mission constraint data associated with real-time mission constraints from a respective plurality of mission constraint databases and convert the mission constraint data into the central data format. A mission control adapter receives control data from a mission control station to convert mission control data into the central data format and to provide mission status data to the at least one mission control station for real-time control of the mission. A data model repository maintains a universal data model that tracks real-time interactive states of the plurality of mission assets, the real-time mission constraints, and the mission control data. The data model repository also generates the mission status data in real-time based on the universal data model.

Another example includes a method for managing a mission associated with a federated system. The method includes converting situational awareness data received via a plurality of asset adapters associated with a respective plurality of mission assets in a geographic region of interest into a central data format. The method also includes converting geographic map data associated with the geographic region of interest and provided via a geospatial map software program into a graphical virtual environment in the central data format via a map adapter. The method also includes maintaining a universal data model in the central data format in a data model repository in response to the situational awareness data, the universal data model comprising real-time interactive states of the plurality of mission assets in response to the situational awareness data. The method further includes generating a real-time three-dimensional graphical rendering via a plug-in graphics framework, the real-time three-dimensional graphical rendering comprising interaction of the plurality of mission assets with the graphical virtual environment based on the universal data model.

Another example includes a federated system manager. The manager includes a plurality of asset adapters configured to receive situational awareness data via respective data formats associated with mission planning/command and control interfaces from a respective plurality of mission assets, and to convert the respective data formats associated with the situational awareness data into a central data format. The manager also includes a plurality of mission constraint adapters configured to receive mission constraint data associated with real-time mission constraints from a respective plurality of mission constraint databases and to convert the mission constraint data into the central data format. The manager also includes at least one mission control adapter configured to receive control data from a respective at least one mission control station to convert mission control data into the central data format and to provide mission status data to the at least one mission control station for real-time control of the mission. The manager also includes a data model repository configured to maintain a universal data model in a graphical manner within a graphical virtual environment associated with a geographic region of interest in the central data format based respectively on the situational awareness data, the mission constraint data, and the mission control data. The universal data model includes real-time interactive states of the plurality of mission assets, the real-time mission constraints, and the mission control data. The data model repository can be further configured to provide the mission status data as the real-time interactive states in the graphical virtual environment based on the universal data model. The manager further includes a communications adapter that is configured to convert a plurality of communication protocols associated with a network to the central data format to provide access to the network to facilitate at least one of the control data and the mission status data between a plurality of user interface devices and the data model repository via the network.

BRIEF DESCRIPTION OF THE DRAWINGS

FIG. 9 illustrates an example diagram of a list of API calls and corresponding adapter commands provided to instantiate API calls with the universal data model.

FIG. 10 illustrates an example of a method for managing a mission.

DETAILED DESCRIPTION

Figure 1:
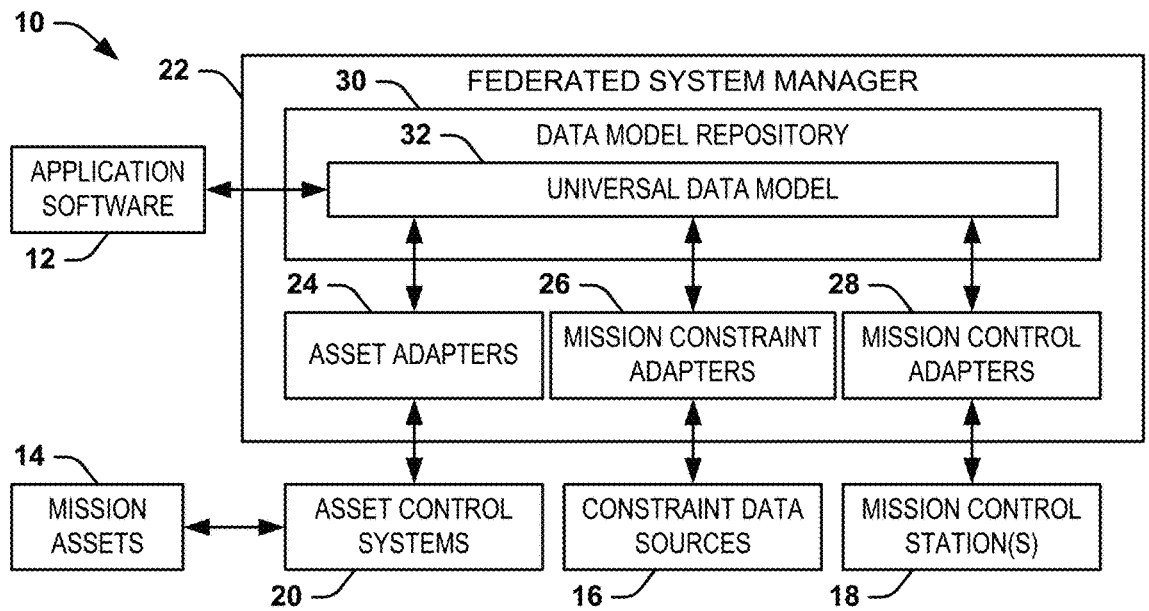
FIG. 1 illustrates an example of a federated mission management system.

The present invention relates generally to communications system integration, and specifically to federated system mission management. A federated system manager can serve as a control architecture for a federated system to implement mission control of all aspects of a mission. The federated system manager can receive different types of data from many disparate sources, and thus includes numerous adapters to convert all received data to a central format, and which can also convert the central data format to transmitted data of a type suitable for the destination of the data. As an example, the mission can include a plurality of different mission assets that can include different types of vehicles, both manned and unmanned, as well as soldiers, satellites, stationary facilities, or any other contributors to completion of a mission objective, and which can all be located in separate respective geographic locations. Each of the mission assets can communicate to the federated system manager via a mission/control interface that can be communicatively coupled with a respective asset adapter to allow communication with the federated system manager in the central data format. Therefore, the asset adapters can receive situational awareness data from the mission assets and can convert the situational awareness data to the central data format, and can convert control data from the central data format to the native data format of the respective mission asset.

The federated system manager can also receive data from and provide data to other external sources/destinations. For example, the federated system manager can also include mission constraint adapters that are configured to convert mission constraint data to the central format. As an example, the mission constraint data can include environmental data, such as weather, time related data, tasking, terrain, threats, or other data associated with the conditions or parameters of the mission. The federated system manager can also include mission control adapters that are configured to communicate with one or more user interface devices, such as can be implemented at mission control station(s) that can provide active control of the mission, or can be merely passive observers. The communication of the mission control can include providing active inputs to the mission, such as to control or command the mission assets, or can include mission status data that can correspond to a real-time status of the mission.

The mission control data, the mission constraint data, and the situational awareness data can all be converted to the central data format to be maintained as a universal data model in a data model repository. As an example, the data model repository can interact with application software corresponding to the mission and mission objectives. The universal data model can track the real-time interactive states of the mission assets, the mission constraints, and the mission controls. As an example, the universal data model can be configured as a three-dimensional graphical plug-in framework that can interact with a geospatial map software program (e.g., converted to the central data format based on a respective adapter). Thus, the universal data model can track the real-time interactive states of the mission assets, the mission constraints, and the mission controls in a graphical manner, such that a three-dimensional graphical rendering adapter can provide the mission status data in a graphical manner to users at the respective user interface devices. Accordingly, all aspects of the mission can be managed in real-time based on the conversion of the received situational awareness data, mission control data, and mission constraint data to the central data format, the maintained universal data model, and the mission status data that is converted to a native format for display to one or more users.

FIG. 1 illustrates an example of a mission management system 10. The federated mission management system 10 can correspond to management of a federated system that implements different sets of tools that collectively are tasked with accomplishing one or more mission objectives. The federated mission management system 10 includes application software 12 that has been written to define the mission objectives based on the known sets of tools that are available for accomplishing the mission objectives. In the example of FIG. 1, the sets of tools that are available for accomplishing the mission objectives are demonstrated as mission assets 14, constraint data sources 16, and one or more mission control stations 18.

The mission assets 14 can correspond to a variety of different physical mission assets that are implemented to provide specific actions to accomplish the mission objectives. As an example, the mission assets 14 can include manned assets, such as vehicles (e.g., airborne vehicles, terrestrial vehicles, and/or nautical vehicles) and/or personnel (e.g., soldiers, reconnaissance personnel, supporting personnel, etc.), as well as unmanned assets, such as satellites, unmanned aerial vehicles (UAVs), or other unmanned vehicles. The mission assets 14 are demonstrated as being communicatively coupled to asset control systems 20 that are configured to communicate with the mission assets 14 in a native communication format. As an example, each of the mission assets 14 can transmit and receive data (e.g., wirelessly) over a respective predetermined communication format. For example, each of the mission assets 14 can transmit situational awareness data (e.g., data associated with status, location, and/or perception of the respective mission asset 14) to a respective one of the asset control systems 20 using the predetermined communication format, and can receive control data (e.g., data associated with commands, control, and/or orders for the respective mission asset 14) from the respective one of the asset control systems 20 using the predetermined communication format.

The constraint data sources 16 can correspond to any of a variety of external data sources associated with conditions of the mission and/or mission objectives. As an example, the constraint data sources 16 can include databases that are associated with weather conditions in a geographic region of interest in which the mission takes place. As another example, the constraint data sources 16 can include information about the topology or other physical environmental conditions associated with the geographic region of interest. As yet another example, the constraint data sources 16 can include databases that include information about known threats, such as range of weaponry, line of sight, reaction time, or a variety of other known information. Thus, the constraint data sources 16 can provide data that is associated with external and/or ancillary parameters and/or constraints of the mission with which the mission assets 14 may be required to interact to complete the mission objectives.

The mission control station(s) 18 can include a variety of locations or devices with which users can interact with the mission to provide control inputs and/or to receive mission status data. As an example, the mission control station(s) 18 can include a tactical operations center (TOC) that can include a plurality of commonly-located user interface devices that can provide mission control data and receive mission status data to a group of users. As another example, the mission control station(s) 18 can include any number of user interface devices that are communicatively coupled to a network (e.g., the Internet) that can provide selective mission control data and/or receive mission status data. For example, the mission control station(s) 18 configured as user interface devices coupled to a network can include any of a variety of different types of computing devices, such as enterprise servers, personal computers, laptop computers, tablet computers, smart phones, smart glasses, helmet mounted systems, or any of a variety of other types of electronic devices.

The federated mission management system 10 includes a federated system manager 22 that is configured to provide interaction between the application software 12 and the mission assets 14, the constraint data sources 16, and the mission control station(s) 18. The federated system manager 22 is configured to provide interface of all of the data and communication associated with the application software 12, the mission assets 14, the constraint data sources 16, and the mission control station(s) 18 via a central data format. As an example, the federated system manager 22 can be provided as a JAVA-based set of application plug-in interfaces (APIs) that provide platform independence, thus providing for a wide range of deployment options. For example, the federated system manager 22 can be deployed on high-performance servers, desktop workstations, laptops, tablets, and/or smart phones based on a relatively light-weight programming.

In the example of FIG. 1, the federated system manager 22 includes asset adapters 24, mission constraint adapters 26, and mission control adapters 28, as well as a data model repository 30. The asset adapters 24 are communicatively coupled with the asset control systems 20 to convert the native communication protocols associated with the mission assets 14 into the central data format, and to provide output data (e.g., control data) to the asset control systems 20 in the native communication protocol from the central data format. Similarly, the mission constraint adapters 26 are configured to convert the mission constraint data into the central data format, and the mission control adapters 28 are configured to convert the mission control data into the central data format, and to provide the mission status data in a suitable communication protocol from the central data format. For example, the mission control adapters 28 can be coupled to a network (e.g., the Internet) to receive the mission control data from and to disseminate the mission status data to the user interface devices associated with the mission control station(s) 18.

The data model repository 30 is configured to store and maintain a universal data model 32 in the central data format. The universal data model 32 is configured to track the real-time interactive states of the mission assets 14, the mission constraints 16, and the mission control data associated with the mission control station(s) 18, collectively referred to as "mission elements". Therefore, the mission assets 14, the constraint data sources 16, and the mission control station(s) 18 can be configured as APIs to facilitate communication of respective external data sources/destinations with the universal data model 32. Based on the real-time interactive states of the mission elements, the data model repository can provide the mission status data in real-time, such as provided to the mission control station(s) 18 via the mission control adapters 26. Thus, the application software 12 can interact with the mission assets 14, the constraint data sources 16, and the mission control station(s) 18 via the universal data model 32. As described in greater detail herein, the universal data model 32 can provide the mission status data in a graphical manner within a graphical virtual environment associated with the geographic region of interest, such that the mission assets 14, the constraint data sources 16, and the mission control station(s) 18 can be configured in a visualization abstraction layer (VAL) to provide the capability for user visualization of the universal data model 32.

The federated system manager 22 thus provides a way to integrate multiple disparate data sources and destinations to manage a mission. As an example, the mission can be a military mission, logistics (e.g., for commercial package delivery), communications network distribution (e.g., for satellites and terrestrial stations), or any of a variety of other types of missions. Based on the use of the asset adapters 24, mission constraint adapters 26, and mission control adapters 28, the data sources and destinations can implement existing communications protocols without having to be modified for implementation by the universal data model 32. Thus, implementation of the federated system manager 22 can incur cost and schedule benefits for legacy systems that, depending on respective designs, may incur large cost and schedule impacts if required to reformat complex data structures or make changes to respective data transport mechanisms. In addition, it is to be understood that additional types of adapters can be implemented in the federated system manager 22. For example, the federated system manager 22 can include a middleware adapter, as well, such as described in U.S. patent application Ser. No. 14/989,618, to implement machine-to-machine interface with the federated system manager 22.

Figure 2:
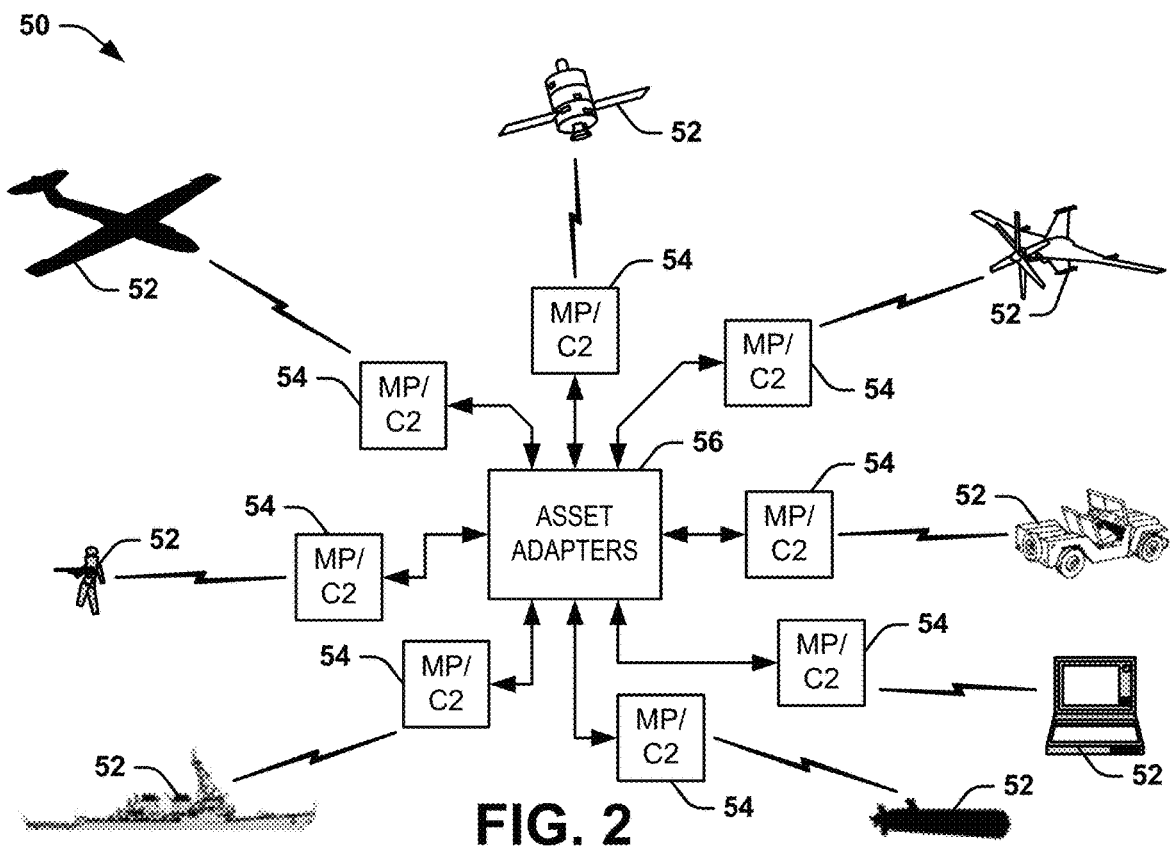
FIG. 2 illustrates an example diagram of mission assets in a federated mission management system.

FIG. 2 illustrates an example diagram 50 of mission assets 52 in a federated mission management system. The federated mission management system provided by the diagram 50 can correspond to the federated mission management system 10 in the example of FIG. 1. Thus, the mission assets 52 demonstrated in the example of FIG. 2 can correspond to the mission assets 14 in the example of FIG. 1. Therefore, reference is to be made to the example of FIG. 1 in the following description of the example of FIG. 2.

The diagram 50 demonstrates different types of mission assets 52 that can be implemented in a given mission. The different types of the mission assets 52 include a satellite, a UAV, a land vehicle, a computer workstation, a sub-surface nautical vehicle, a surface nautical vehicle, a soldier, and a manned aircraft vehicle. The mission assets 52 thus correspond to a variety of different physical mission assets 52 that are implemented to provide specific actions to accomplish mission objectives, such as defined by the application software 12. The mission assets 52 are depicted in the example of FIG. 2 to demonstrate variety of mission assets. Thus, while the mission assets 52 are each demonstrated as one of a variety of different types of mission assets, a given mission can include all, none, or any subset of the demonstrated mission assets 52, with any number of each type of mission asset 52. Additionally, mission assets 52 are not limited to those demonstrated in the example of FIG. 2, but can include other types of mission assets, such as missiles, buildings, or any of a variety of other assets useful for a given mission.

Each of the respective mission assets is demonstrated as being in wireless communication with a respective mission planning/command and control (MP/C2) interface 54. The MP/C2 interfaces 54 can correspond, for example, to the asset control systems 20 in the example of FIG. 1. As an example, each of the MP/C2 interfaces 54 can correspond to respective tactical control interfaces that can be located geographically separate from or located onboard the respective mission assets. As another example, the MP/C2 interfaces 54 can include other mission assets, such that the wireless communication can be routed through multiple MP/C2 interfaces 54. For example, the manned aircraft vehicle 52 can be in wireless communication with an MP/C2 interface 54 on the nautical vehicle mission asset 52 (e.g., an aircraft carrier), which can be in wireless communication with an MP/C2 interface 54 on the satellite mission asset 52, which can be in wireless communication with an MP/C2 interface 66 at a TOC in a geographically remote location, such as including the federated system manager 22.

In the example of FIG. 2, the MP/C2 interfaces 54 are all communicatively coupled with asset adapters 56. The asset adapters 56 can be part of a federated system manager, such as the federated system manager 22 in the example of FIG. 1. Therefore, the asset adapters 56 can provide respective communication interfaces between the central data format and the native communication formats associated with the respective mission assets 52. The communication between the asset adapters 56 and the MP/C2 interfaces 54 can be wired, wireless, or a combination thereof. Therefore, each of the mission assets 52 can transmit situational awareness data to the respective MP/C2 interface 54 using a predetermined communication format, such that the respective one of the asset interfaces 56 can convert the situational awareness data to the central data format for use by the universal data model 32. Similarly, a given asset adapter 56 can convert control data from the central data format to the respective predetermined communication format, such that the respective MP/C2 interface 54 can provide the control data to the respective mission asset 52.

Figure 3:
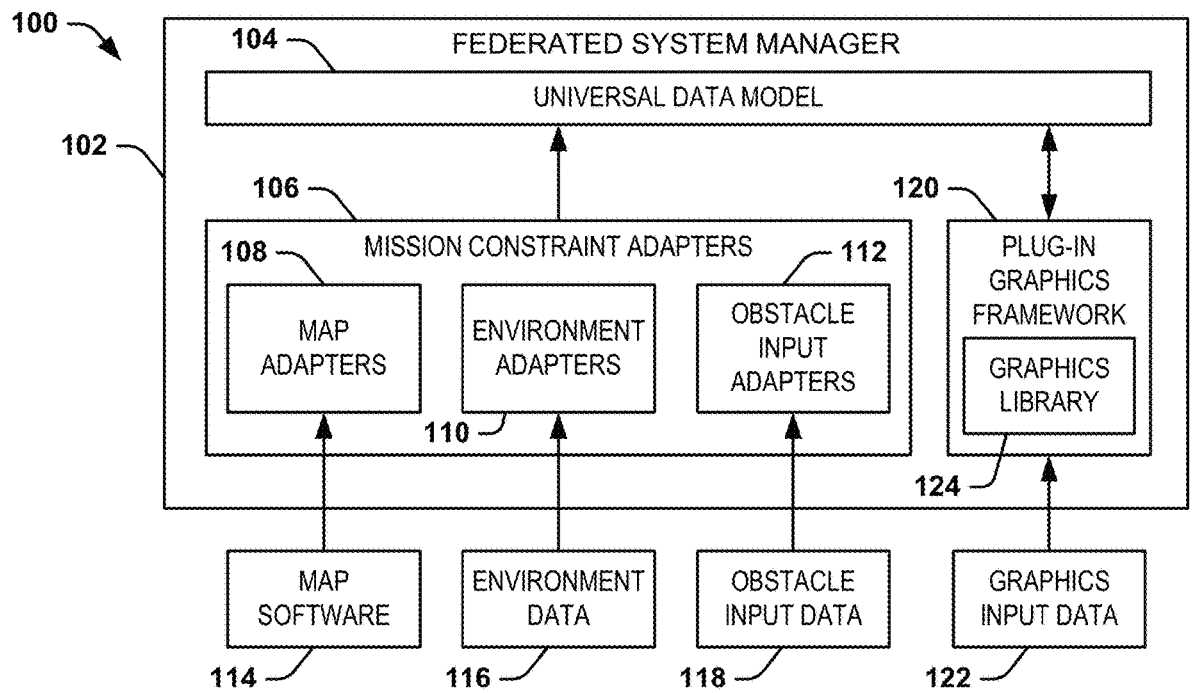
FIG. 3 illustrates another example of a federated mission management system.

FIG. 3 illustrates another example of a federated mission management system 100. The federated mission management system 100 can correspond to the federated mission management system 10 in the example of FIG. 1. Therefore, reference is to be made to the example of FIG. 1 in the following description of the example of FIG. 3.

The federated mission management system 100 includes a federated system manager 102, which can correspond to a portion of the federated system manager 22 in the example of FIG. 1. The federated system manager 102 includes a universal data model 104 that can correspond to the universal data model 32 in the example of FIG. 1, and thus can be maintained in the data model repository 30 (not shown in the example of FIG. 3). The federated mission management system 100 also includes a set of mission constraint adapters 106, demonstrated in the example of FIG. 3 as map adapters 108, environment adapters 110, and obstacle input adapters 112. The map adapters 108 are configured to convert map software 114 to the central data format for the universal data model 104. As an example, the map software 114 can include geospatial map information, such as geospatial coordinate data, topological data, and/or other geospatial information. As an example, the map software 114 can be a commercially available map package, such as provided from any of a variety of third-party software providers. Therefore, the map adapters 108 can convert the proprietary format of the third-party software provider to the central data format. For example, the map software 114 can include Google Earth, World Wind, ArcGIS, and/or a variety of other commercially available geospatial map software programs.

The environment adapters 110 are configured to convert environment data 116, such as provided via one or more external databases, to the central data format for the universal data model 104. As an example, the environment data 116 can be provided from online sources, weather service databases, or a variety of other sources that can provide dynamic environmental conditions. The environment data 116 can thus correspond to weather conditions, such as including precipitation, visibility conditions, humidity, temperature, air pressure, or any of a variety of other conditions that can affect the performance of the mission assets 14. Additionally, the environment data 116 can include time information, such as from a universal clock (e.g., an atomic clock) to provide a unified time resource for the universal data model 104. Therefore, the environment adapters 110 can convert the proprietary format of the third-party external source(s) to the central data format.

The obstacle input adapters 112 are configured to convert obstacle input data 118 to the central data format for the universal data model 104. As an example, the obstacle input data 118 can be provided from inputs provided from one or more user interface devices, such as at a TOC or a remote device that is communicatively coupled to the federated system manager 102 via a network. For example, one of the mission assets 14 can identify an obstacle not previously identified (e.g., a building, a bridge, a threat, etc.), and can transmit a type and a location of the obstacle in the respective situational awareness data that is provided to the federated system manager 102 via the respective asset control system 20, and further to the respective asset adapter 14 that converts the situational awareness data to the central format. Thus, the situational awareness data can correspond to the obstacle input data 118.

Additionally or alternatively, as an example, the universal data model 104 can thus indicate the type and location of the obstacle in the mission status data that is provided users at the mission control station(s) 18 (e.g., via the mission control adapters 28). In response, a user can provide obstacle input data 118 corresponding to characteristics of the obstacle to facilitate tracking the real-time interactive state of the obstacle in the graphical virtual environment, such as with respect to the mission assets 14. For example, the obstacle input data 118 can include speed, range, line of sight, or other known characteristics of a given threat, such that the user can provide such information to the obstacle input adapters 112 to be included in the universal data model 104. As yet another example, a user can input the location and/or type of obstacle directly as the obstacle input data 118, such as in response to the user seeing the obstacle and providing the obstacle input data 118 via a portable user interface device in communicative contact with the federated system manager 102. Accordingly, the obstacle input data 118 can correspond to dynamic conditions that can occur during the mission that can thus be indicated in the mission status data to facilitate potential reaction by the mission assets 14.

In addition, the federated system manager 102 includes a plug-in graphics framework 120. The plug-in graphics framework 120 is configured to facilitate input of graphical elements, demonstrated in the example of FIG. 3 as graphics input data 122, into the universal data model 104, such as to provide graphical information in the graphical virtual environment that can be provided to users as the mission status data. The plug-in graphics framework 120 is configured, for example, as an API to enable integration of new application-specific graphical elements, such as corresponding to mission assets 14 or obstacles, or graphical tools in the central data format to be implemented by the universal data model 104 to facilitate graphical representation of the real-time interactive states of the mission elements in the graphical virtual environment by the universal data model 104. In the example of FIG. 3, the plug-in graphics framework 120 includes a graphics library 124 that is configured to store and maintain the application-specific graphical elements provided via graphics input data 122. The graphics input data 122 can thus include graphics data, characteristic data, and/or other data associated with a given mission element (e.g., mission asset 14 or obstacle) corresponding to a respective application-specific graphical element. Thus, the universal data model 104 can access the graphics library 124 to graphically demonstrate the application-specific graphical elements and to track the real-time interaction of the application-specific graphical elements in the graphical virtual environment.

Figure 4:
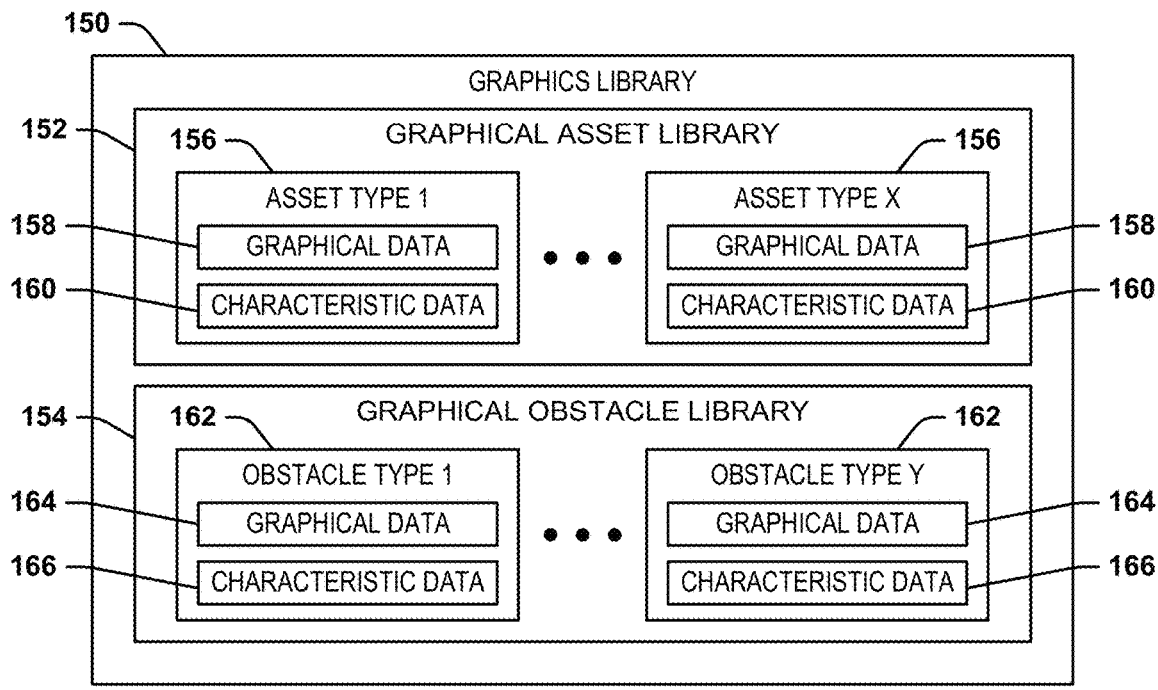
FIG. 4 illustrates an example diagram of libraries in a federated mission management system.

FIG. 4 illustrates an example of a graphics library 150 in a federated mission management system. The graphics library 150 can correspond to the graphics library 150 in the example of FIG. 3. The graphics library 150 includes a graphical asset library 152 and a graphical obstacle library 154. While the graphics library 150 is described more generally with respect to the graphical asset library 152 and the graphical obstacle library 154, the graphics library 150 can be implemented to store any graphical element that can be displayed as part of the graphical mission status data, such as three-dimensional asset models, routes, tracks, threats, tasks, map data, weather, three-dimensional zones, sensor footprints, and/or sensor data, such as frame or video image overlays.

The graphical asset library 152 is configured to store different types of application-specific graphical elements that correspond to the different types of mission assets 14, such as the mission assets 52 in the example of FIG. 2. In the example of FIG. 4, the graphical asset library 152 stores a plurality X of asset types 156, where X is a positive integer. Each asset type 156 can correspond to an entry that describes substantially all aspects of a respective type of mission asset 14, including graphical data 158 and characteristic data 160. The graphical data 158 can correspond to a standard graphical depiction of the respective asset type 156, as appearing visually in the graphical virtual environment. The graphical data 158 of a given asset type 156 can also include additional graphical information regarding operation of the respective mission asset 14 during the mission, such as flight-mode relative to terrestrial-mode for an aircraft, discharge of weapons, or other graphical depictions of operation of the respective mission asset 14 that can be usefully presented as mission status data to users.

The characteristic data 160 can correspond to graphical tools and depictions, operational data, descriptive data, and a variety of other useful information about the respective asset type 156 that affect the universal data model 104 and/or the mission status data with respect to a respective mission asset 14. For example, the characteristic data 160 can include fuel capacity, as affecting range of the mission asset 14, ordnance capacity, weapon range, speed capability, maneuverability, or a variety of other characteristics of the mission asset 14. Such characteristics of a given mission asset 14, and which can thus be stored as the characteristic data 160 of the respective asset type 156, can be implemented by the universal data model 104 for maintaining the real-time interactive state of the respective mission asset 14, and can graphically demonstrate the respective characteristics of the mission asset in the graphical virtual environment, as provided in the mission status data. Additionally, the universal data model 104 can implement the characteristic data 160 for simulation purposes, as described in greater detail herein, such as to implement simulations and to test "what-if" scenarios for planning a mission using a given set of mission assets 14.

The graphical asset library 152 also stores a plurality Y of obstacle types 162, where Y is a positive integer. Each obstacle type 162 can correspond to an entry that describes substantially all known aspects of different types of obstacles that can be encountered or accounted for in the mission, including graphical data 164 and characteristic data 166. The graphical data 164 and characteristic data 166 can be associated with data similar to as described previously for the graphical data 164 and characteristic data 166 of a given asset type 156, such as based on known parameters of a given obstacle type 162. As an example, the graphical data 164 of a given obstacle type 162 can correspond to a standard graphical depiction of the respective obstacle type 162, as appearing visually in the graphical virtual environment. For example, the graphical data 164 can reflect different states of the respective obstacle type 162, such as operational, damaged, destroyed, deployed, active, inactive, or any of a variety of other states that can describe different conditions associated with the respective obstacle. The characteristic data 166 of the obstacle type 162 can correspond to graphical tools and depictions, operational data, descriptive data, and a variety of other useful information about the respective obstacle type 162 that affect the universal data model 104 and/or the mission status data with respect to a respective obstacle in the geographic region of interest, similar to as described previously with respect to the characteristic data 160 of the asset type 156.

Figure 5:
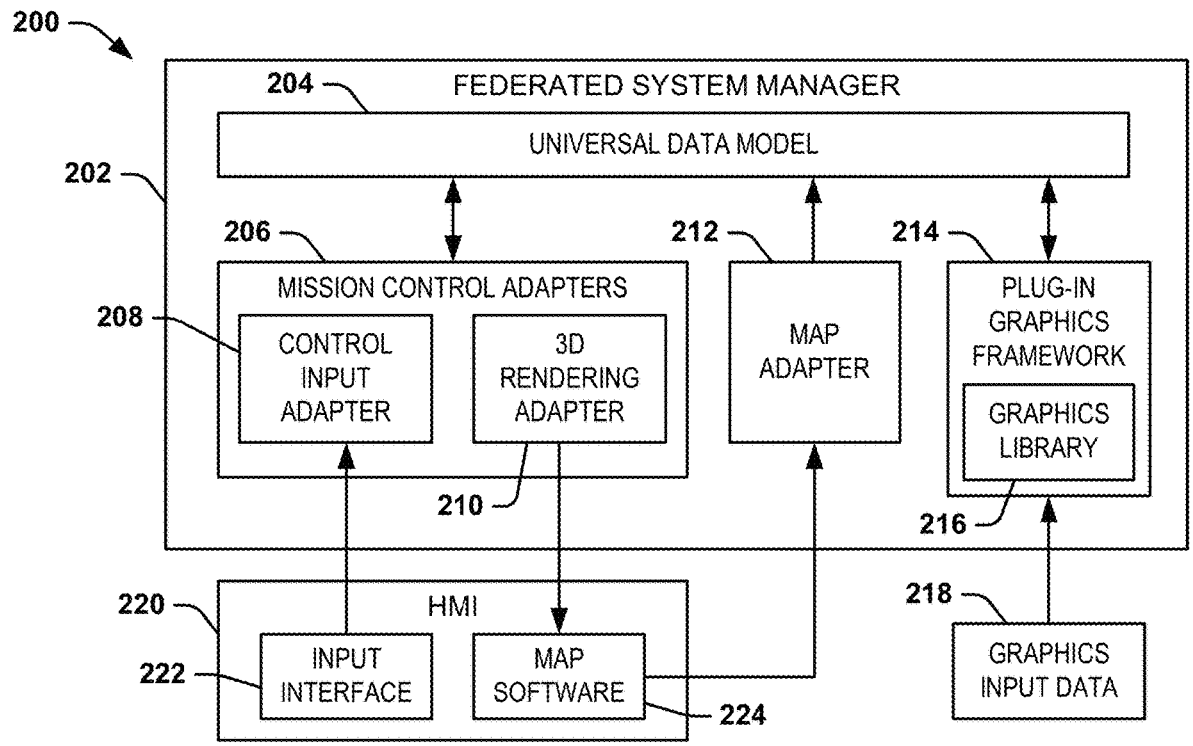
FIG. 5 illustrates yet another example of a federated mission management system.

FIG. 5 illustrates yet another example of a federated mission management system 200. The federated mission management system 200 can correspond to the federated mission management system 10 in the example of FIG. 1. Therefore, reference is to be made to the example of FIG. 1 in the following description of the example of FIG. 5.

The federated mission management system 200 includes a federated system manager 202, which can correspond to a portion of the federated system manager 22 in the example of FIG. 1. The federated system manager 202 includes a universal data model 204 that can correspond to the universal data model 32 in the example of FIG. 1, and thus can be maintained in the data model repository 30 (not shown in the example of FIG. 5). The federated mission management system 200 also includes a set of mission control adapters 206, demonstrated in the example of FIG. 5 as a control input adapter 208 and a three-dimensional graphical rendering adapter 210 ("3D RENDERING ADAPTER"). The federated system manager 202 also includes a map adapter 212, such as can be included in a set of mission constraint adapters (e.g., one of the map adapters 108 in the set of mission constraint adapters 106 in the example of FIG. 3). Furthermore, the federated system manager 202 includes a plug-in graphics framework 214. The plug-in graphics framework 214 is configured to facilitate input of graphical elements, demonstrated in the example of FIG. 5 as graphics input data 216, into the universal data model 204, such as to provide graphical information in the graphical virtual environment that can be provided to users as the mission status data. In the example of FIG. 5, the plug-in graphics framework 214 includes a graphics library 218 that is configured to store and maintain the application-specific graphical elements provided via graphics input data 216. As an example, the graphics library 218 can be configured substantially similar to the graphics library 150 in the example of FIG. 4. Thus, the universal data model 204 can access the graphics library 218 to graphically demonstrate the application-specific graphical elements and to track the real-time interaction of the application-specific graphical elements in the graphical virtual environment.

The federated mission management system 200 includes a human machine interface (HMI) 220 that can correspond to a user interface device via which one or more users can control and/or monitor the mission via the federated system manager 202. As an example, the HMI 220 can be co-located with the federated system manager 202, such as at a TOC, or can be coupled to a network, and thus can be remotely located to provide control of and/or monitoring capability of the mission via the network. The HMI 220 includes an input interface 222 and map software 224. As an example, the map software 224 can include geospatial map information, such as geospatial coordinate data, topological data, and/or other geospatial information. As an example, the map software 224 can be a commercially available map package, such as provided from any of a variety of third-party software providers. The map software 224 can include Google Earth, World Wind, ArcGIS, and/or a variety of other commercially available geospatial map software programs, such that the map adapter 212 can convert the map software 214 to the central data format for the universal data model 204.

The input interface 222 is configured to receive user inputs provided at the HMI 220. As an example, the user inputs can correspond to control or command inputs, such as to issue orders to a given one or more of the mission assets 14. For example, the user inputs can include commands to provide route information to mission assets 14, orders to target an obstacle and/or release ordnance, takeoff, landing, or any of a variety of other orders that can be provided to one or more of the mission assets 14 to facilitate completion of the mission. The control input adapter 208 can thus convert the control input to the central data format, such that the universal data model 204 can implement the control input in the tracking of the real-time interactive states of the mission elements. For example, the universal data model 204 can track the conditions, states, locations, movement, and any other physical aspect of the mission assets 14, obstacles, and/or other physical features of the mission in real-time based on the control inputs.

The universal data model 204 can thus provide the mission status data based on the tracked real-time interactive states of the mission elements. As an example, the universal data model 204 can implement the map software 224 via the map adapter 212 to generate the graphical virtual environment corresponding to the geographic region of interest. The universal data model 204 can also determine a physical location of all of the mission assets 14, obstacles, and other aspects of the mission in the geographic region of interest based on the situational awareness data provided by the mission assets 14 and/or inputs (e.g., the obstacle input data 118 in the example of FIG. 3), and can import the physical locations of the mission assets 14, obstacles, and other aspects of the mission into corresponding physical locations in the graphical virtual environment. The universal data model 204 can thus continuously provide the interactive states of the mission assets 14, obstacles, and other aspects of the mission in the graphical virtual environment as the mission status data to the three-dimensional graphical rendering adapter 210 that can provide a graphical representation of the mission assets 14, obstacles, and other aspects of the mission in the graphical virtual environment in real-time. For example, the three-dimensional graphical rendering adapter 210 can obtain the graphical representation of the mission assets 14, obstacles, and other aspects of the mission from the graphics library 218 via the universal data model 204 for graphical representation of all of the mission assets 14, obstacles, and other aspects of the mission. Accordingly, the three-dimensional graphical rendering adapter 210 can provide such graphical representation via the map software 224, such that the real-time interactive states of all of the mission elements can be demonstrated graphically in the graphical virtual environment via the map software 224 on a display device of the HMI 220. Accordingly, a user can interact with the mission in real-time, such as by monitoring progress of the mission in real-time and providing the control inputs via the input interface 222.

As an example, the universal data model 204 can be optimized with respect to the graphical elements in the plug-in graphics framework 214 and the graphics library 218 to provide real-time video frame rates, even when the number of application-specific graphical elements being rendered is significantly large. Therefore, the universal data model 204 can manage a large number of federated assets and track the real-time interactive states of a large number of mission elements. Thus, the universal data model 204, along with the plug-in graphics framework 214 and the graphics library 218, can permit the use of commercially available and highly-tuned three-dimensional rendering engines (e.g., NASA's World Wind) instead of requiring a dedicated rendering engine to be programmed to operate in the federated system manager 202. Additionally, the loose coupling of the universal data model 204 and the plug-in graphics framework 214 with external rendering engines can permit affordable upgrades to new rendering technologies as they become available, or as legacy technologies become obsolete or unsupported by a respective commercial vendor.

The HMI 220 in the example of FIG. 5 is an example of a single user interface with which a user can interact with the federated system manager 202, such as at a TOC or single point of monitoring and/or control. In the example of FIG. 5, the HMI 220 is also demonstrated as having a direct communication with the federated system manager 202. However, it is to be understood that the HMI 220 can be communicatively coupled with the federated system manager 202 via a network, such that the HMI 220 is located remote from the federated system manager 202. Additionally, the federated mission management system 200 can include a plurality of different user interface devices that can be geographically remotely located relative to each other and/or the federated system manager 202, with each such user interface device having at least partial capability of interacting with the federated system manager 202.

Figure 6:
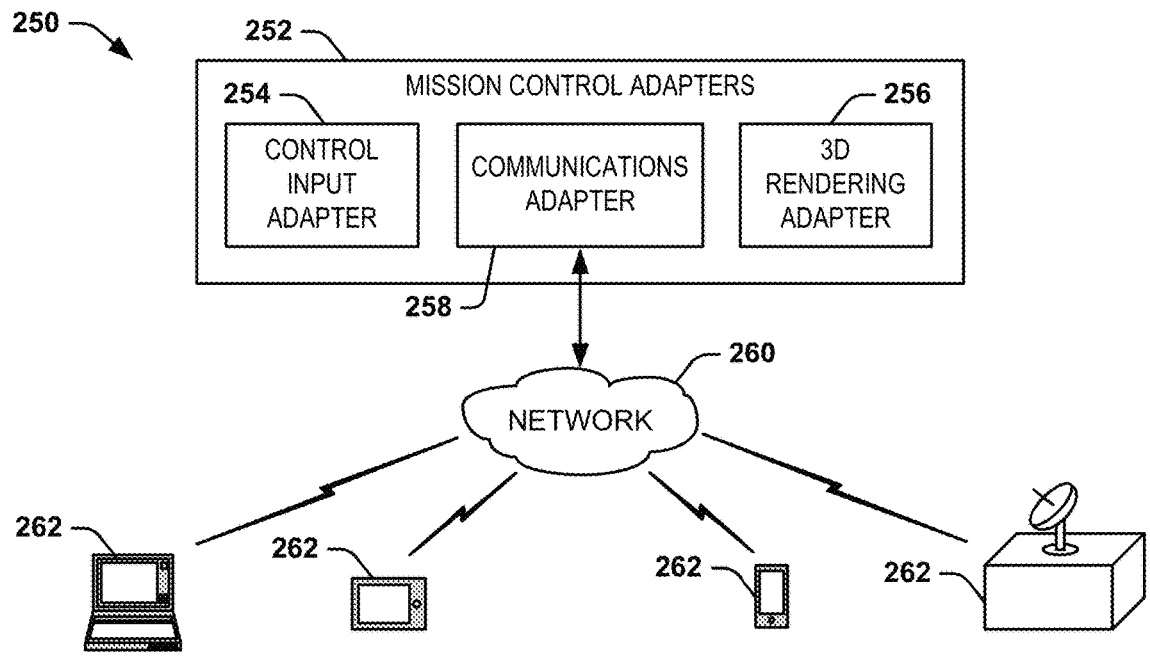
FIG. 6 illustrates an example diagram of communication in a federated mission management system.

FIG. 6 illustrates an example diagram 250 of communication in a federated mission management system. The diagram 250 can correspond to communication in the federated mission management system 10 in the example of FIG. 1, the federated mission management system 100 in the example of FIG. 3, or the federated mission management system 200 in the example of FIG. 5. Thus, reference is to be made to the examples of FIGS. 1-5 in the following description of the example of FIG. 6.

The diagram 250 includes a set of mission control adapters 252. As an example, the set of mission control adapters 252 can be implemented in the federated system manager 22, the federated system manager 102, or the federated system manager 202. The set of mission control adapters 252 are demonstrated in the example of FIG. 6 as including a control input adapter 254, a three-dimensional graphical rendering adapter 256 ("3D RENDERING ADAPTER"), and a communications adapter 258. The control input adapter 254 and the three-dimensional graphical rendering adapter 256 can be configured substantially similar to the control input adapter 208 and the three-dimensional graphical rendering adapter 210, respectively, in the example of FIG. 5. The communications adapter 258 is demonstrated in the example of FIG. 6 as communicatively coupled to a network 260. As an example, the network 260 can correspond to the Internet, or can be a local area network (LAN) or a wide area network (WAN). The communications adapter 258 can be configured to convert communications received from the network 260 to the central data format to be implemented by the universal data model (e.g., the universal data model 204). Alternatively, the communications adapter 258 can operate as a data router to provide the received data to the appropriate other adapters for converting the data into the central data format. Additionally, the communications adapter 258 is configured to convert output data, such as command data for the mission assets 14 or mission status data, to the appropriate data format for transmission on the network 260.

In the example of FIG. 6, the diagram 250 demonstrates a plurality of user interface devices 262 communicatively coupled to the network 260. The user interface devices 262 are demonstrated as including a personal computer, a tablet computer, a smartphone, and an enterprise facility, such as a TOC that may include one or more computers (e.g., servers) therein. Each of the user interface devices 262 are demonstrated as being wirelessly coupled to the network 260, such as via satellite, cellular network, Wi-Fi, or other wireless connection, but it is to be understood that the coupling of the respective user interface devices 262 with the network 260 can be provided as a wired or other connection, as well. Thus, each of the user interface devices 262 can be in bi-directional communication with the federated system manager (e.g., the federated system manager 202) via the network 260 to separately and/or distinctly provide control inputs and/or receive mission status data. As an example, the communications adapter 258 can include encryption protocols to provide that the communications between the user interface devices 262 and the respective federated system manager is a secure connection. Furthermore, the communications adapter 258 can provide communications routing between the respective user interface devices 262, such that users at each of the user interface devices 262 can communicate via voice or text with each other via the network 260 and the communications adapter 262, with or without interfacing with the respective universal data model.

The communications protocols can include protocols associated with network messaging as well as other types of messaging, such as for unmanned vehicles. Thus, communications adapters 258 can also be associated with asset adapters 24 to provide communication interface between the respective universal data model and the mission assets 14. As an example, the communications adapter 258 can include messaging adapters for a variety of communications protocols Operator Messaging Service (OMS), Future Airborne Capability Environment (FACE), Unmanned Aerospace Systems (UAS) C2 Standards Initiative (UCI), UAS Control Segment (UCS), and STANAG 4586. By extension, adapters for Joint Architecture for Unmanned Systems (JAUS) and other standards can also be included. As another example, the communications adapter 258 can include a framework for developing plug-in message adapters for all messaging standards, such as in a manner similar to the plug-in graphics framework 214. Such a plug-in message adapter framework can provide the respective federated system manager the ability to perform machine-to-machine message and data exchanges with external systems, such as unmanned vehicle communication standards or other communication standards to provide unidirectional or bidirectional communication.

Figure 7:
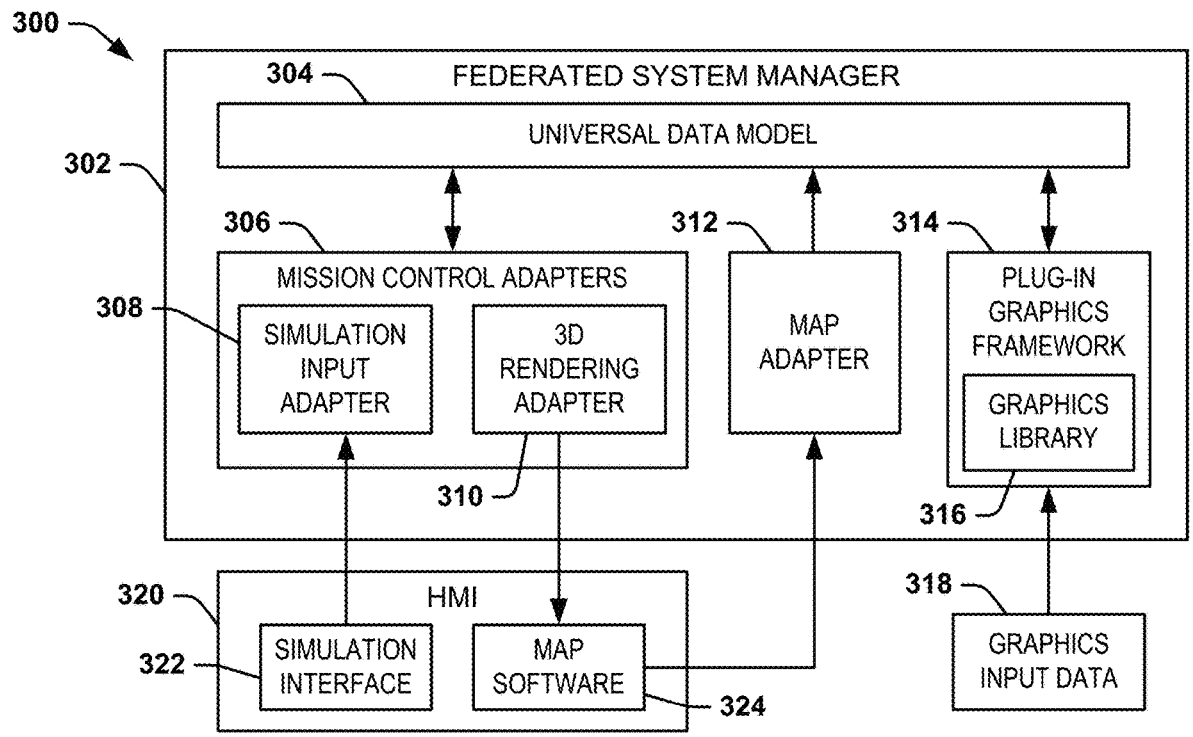
FIG. 7 illustrates yet a further example of a federated mission management system.

FIG. 7 illustrates yet another example of a federated mission management system 300. The federated mission management system 300 can correspond to the federated mission management system 10 in the example of FIG. 1. Therefore, reference is to be made to the example of FIG. 1 in the following description of the example of FIG. 7.

The federated mission management system 300 includes a federated system manager 302, which can correspond to a portion of the federated system manager 22 in the example of FIG. 1. The federated system manager 302 includes a universal data model 304 that can correspond to the universal data model 32 in the example of FIG. 1, and thus can be maintained in the data model repository 30 (not shown in the example of FIG. 7). The federated mission management system 300 also includes a set of mission control adapters 306, demonstrated in the example of FIG. 7 as a simulation input adapter 308 and a three-dimensional graphical rendering adapter 310 ("3D RENDERING ADAPTER"). The federated system manager 302 also includes a map adapter 312, such as can be included in a set of mission constraint adapters (e.g., one of the map adapters 108 in the set of mission constraint adapters 106 in the example of FIG. 3). Furthermore, the federated system manager 302 includes a plug-in graphics framework 314. The plug-in graphics framework 314 is configured to facilitate input of graphical elements, demonstrated in the example of FIG. 7 as graphics input data 316, into the universal data model 304, such as to provide graphical information in the graphical virtual environment that can be provided to users as the mission status data. In the example of FIG. 7, the plug-in graphics framework 314 includes a graphics library 318 that is configured to store and maintain the application-specific graphical elements provided via graphics input data 316. As an example, the graphics library 318 can be configured substantially similar to the graphics library 150 in the example of FIG. 4. Thus, the universal data model 304 can access the graphics library 318 to graphically demonstrate the application-specific graphical elements and to track the real-time interaction of the application-specific graphical elements in the graphical virtual environment.

The federated mission management system 300 includes an HMI 320 that can correspond to a user interface device via which one or more users can control and/or monitor the mission via the federated system manager 302. Additionally, as described herein, the HMI 320 can provide simulation inputs to simulate a mission or parts of a mission. As an example, the HMI 320 can be co-located with the federated system manager 302, such as at a TOC, or can be coupled to a network, and thus can be remotely located to provide control of and/or monitoring capability of the mission via the network. The HMI 320 includes a simulation interface 322 and map software 324. As an example, the map software 324 can include geospatial map information, such as geospatial coordinate data, topological data, and/or other geospatial information. As an example, the map software 324 can be a commercially available map package, such as provided from any of a variety of third-party software providers. The map software 324 can include Google Earth, World Wind, ArcGIS, and/or a variety of other commercially available geospatial map software programs, such that the map adapter 312 can convert the map software 314 to the central data format for the universal data model 304.

The simulation interface 322 is configured to receive simulation inputs provided at the HMI 320, which are converted to the central data format via the simulation input adapter 308. As an example, the simulation inputs can correspond to simulation parameters and/or constraints corresponding to mock mission assets 14 and/or mock obstacles to be provided in a given simulation environment. Thus, the simulation parameters and/or constraints can be implemented to set up a simulated mission that includes one or more simulated mission assets 14, obstacles, or other simulated mission constraints (e.g., such as normally input via the constraint data sources 16 in the example of FIG. 1). For example, the simulation inputs can include simulated components that can have real-time interactive states that can be tracked in the universal data model 304 along with real (i.e., physical) mission assets 14, obstacles, control inputs, and/or other real or simulated mission constraints. Therefore, the simulation inputs provided via the simulation interface 322, as converted to the central data format via the simulation input adapter 308, can be implemented as a fully simulated mission (e.g., a virtual mission), or can be one or more simulated components of a real mission to simulate the real-time interaction of actual physical components of the mission (e.g., the mission assets 14) with the simulated components. Accordingly, the universal data model 304 can track the conditions, states, locations, movement, and any other physical or simulated aspect of the mission assets 14, obstacles, and/or other physical or simulated features of the mission in real-time based on the simulation inputs, as well as control inputs (e.g., as provided via an input interface, such as the input interface 222, on the HMI 320).

The universal data model 304 can thus provide the mission status data based on the tracked real-time interactive states of the simulated and/or physical mission elements. As an example, the universal data model 304 can implement the map software 324 via the map adapter 312 to generate the graphical virtual environment corresponding to the geographic region of interest. The universal data model 304 can also determine a simulated and/or physical location of all of the mission assets 14, obstacles, and other aspects of the mission in the geographic region of interest based on the situational awareness data provided by the mission assets 14 and/or inputs (e.g., the obstacle input data 118 in the example of FIG. 3), and can import the simulated and/or physical locations of the mission assets 14, obstacles, and other aspects of the mission into corresponding simulated and/or physical locations in the graphical virtual environment. The universal data model 304 can thus continuously provide the interactive states of the mission assets 14, obstacles, and other aspects of the mission in the graphical virtual environment as the mission status data to the three-dimensional graphical rendering adapter 310 that can provide a graphical representation of the simulated and/or physical mission assets 14, obstacles, and other aspects of the mission in the graphical virtual environment in real-time. For example, the three-dimensional graphical rendering adapter 310 can obtain the graphical representation of the mission assets 14, obstacles, and other aspects of the mission from the graphics library 318 via the universal data model 304 for graphical representation of all of the mission assets 14, obstacles, and other aspects of the mission. Accordingly, the three-dimensional graphical rendering adapter 310 can provide such graphical representation via the map software 324, such that the real-time interactive states of all of the simulated and/or physical mission elements can be demonstrated graphically in the graphical virtual environment via the map software 324 on a display device of the HMI 320. Accordingly, a user can interact with the simulated mission or simulated mission components in real-time, such as by monitoring progress of the mission in real-time and providing the simulation inputs via the simulation interface 322, as well as control inputs. Furthermore, a given simulation can be recorded and stored in memory, such as to facilitate playback and in-process modification.

Figure 8:
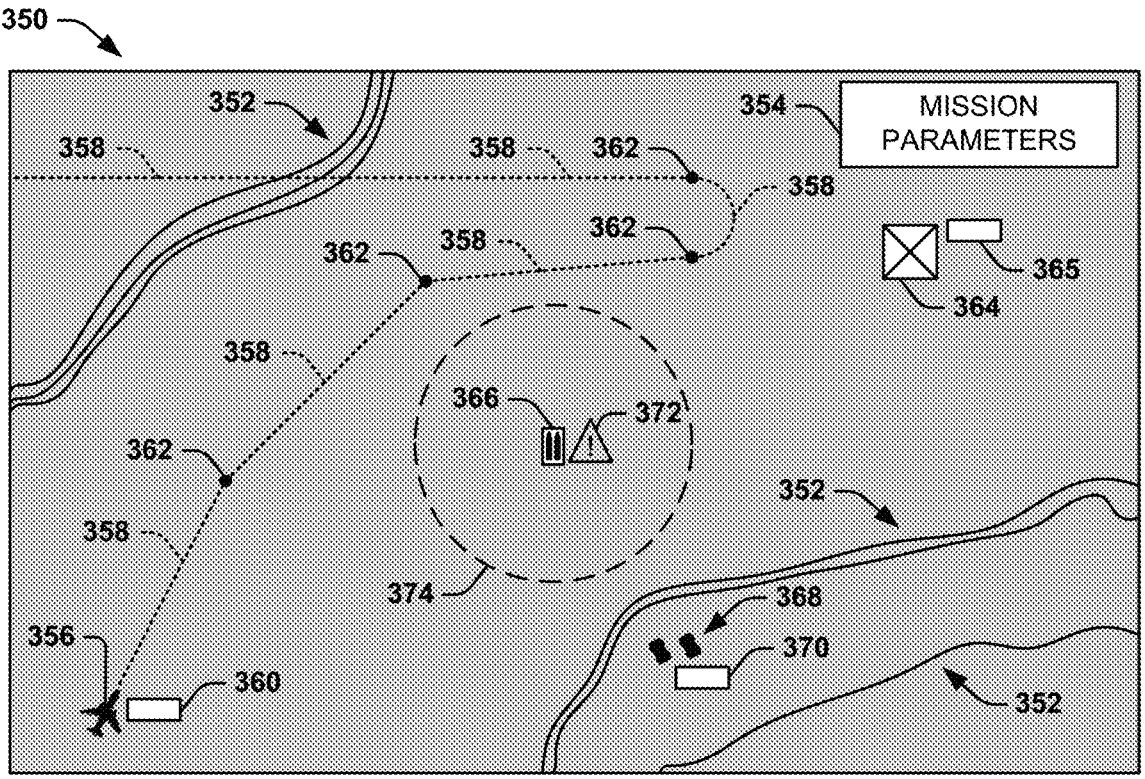
FIG. 8 illustrates an example diagram of a mission display in a federated mission management system.

FIG. 8 illustrates an example diagram 350 of a mission display in a federated mission management system. The federated mission management system can correspond to any or all of the mission managements systems 10, 100, 200, or 300 in the respective examples of FIGS. 1, 3, 5, and 7. Therefore, reference is to be made to the examples of FIGS. 1-7 in the following description of the example of FIG. 8.

The diagram 350 demonstrates a graphical virtual environment of a geographic region of interest. As an example, the graphical virtual environment of the diagram 350 can be displayed in real-time on a display of a user interface device (e.g., the HMI 220), such as coupled to a federated system manager via a network (e.g., the network 260). Therefore, a user can visually monitor the mission status in real-time as the mission occurs via the HMI display device, and can potentially interact with the mission, such as by providing control and/or simulation inputs via the respective user interface device. As an example, the user interface device can provide passive display capability, or can also receive user inputs via an input interface (e.g., the input interface 222), such as to facilitate control inputs to the control aspects of the mission (e.g., via a touch screen, voice commands, peripheral input devices, etc.).

In the example of FIG. 8, the diagram 350 demonstrates a three-dimensional topographical map on which application-specific graphical elements are superimposed. For example, the three-dimensional topographical map can be provided via map software (e.g., a third-party geospatial map software program) that has been processed via a map adapter (e.g., the map adapter 212). Additionally, the application-specific graphical elements can have been accessed by a respective universal data model (e.g., the universal data model 204) from a graphics library (e.g., the graphics library 250). The three-dimensional topographical map is demonstrated as including topographical features 352 to provide details of the associated environment (e.g., as provided via a constraint data source 16). As an example, the user can change a perspective view of the three-dimensional topographical map via the respective user interface device, such that the real-time interactive states of the aspects of the mission can be viewed in any of a variety of three-dimensional perspective views. Additionally, the diagram 350 can include a menu or display box 354 that can include peripheral information regarding the mission constraints, such as provided via the mission constraint data sources 16.

In the example of FIG. 8, the diagram 350 demonstrates an aircraft 356 (e.g., a UAV) that can correspond to a mission asset and which has a graphically demonstrated flight-path 358. The position of the aircraft 356 can be provided in real-time via situational awareness data (e.g., via an asset control system 20 and associated asset adapter 24). The aircraft 356 includes a tag 360 that can correspond to additional situational awareness, such as corresponding to one of a variety of different states of the aircraft 356, and which can be expanded from a minimized state (e.g., to minimize overlap of the tag 360 with respect to the three-dimensional topographical map) to demonstrate additional information. The flight-path 358 can have been designated via control inputs (e.g., via the control input adapter 208), and includes a series of way points 362 at which the flight-path 358 changes. The flight-path 358 can thus demonstrate a path toward a mission objective 364 (e.g., including an associated tag 365), at which the aircraft 356 can perform a mission objective (e.g., launch ordnance, capture photographs, etc.). As an example, the way points 362 can have been dynamically provided via control inputs, such as in response to potential danger from an obstacle 366 that can be a threat to the aircraft 356.

The diagram 350 also includes two ground vehicles 368 that can also correspond to mission assets. The position of the ground vehicles 368 can be provided in real-time via situational awareness data (e.g., via an asset control system 20 and associated asset adapter 24). The ground vehicles 368 likewise include a tag 370 that can correspond to additional situational awareness, such as corresponding to one of a variety of different states of the ground vehicles 368. As an example, the ground vehicles 368 can have spotted the obstacle 366 and provided the location of the obstacle 366 as part of the respective situational awareness data of the ground vehicle(s) 368. Additionally or alternatively, the ground vehicle(s) 368 can provide data regarding the obstacle 366 via a user interface device, such that the input can be provided as obstacle input data 118. For example, the situational awareness data of the vehicle(s) 368 can include the type of the obstacle 366 (e.g., a given type of anti-aircraft threat).

Upon identifying the type of the obstacle 366, the universal data model can access the specific entry for the obstacle type (e.g., an obstacle type 162) to obtain the graphical data and characteristic data (e.g., the graphical data 164 and characteristic data 166) for the obstacle type associated with the obstacle 366. The universal data model can thus provide the obstacle 366 as a graphical representation in the graphical virtual environment (e.g., via the three-dimensional graphical rendering adapter 210) at a location corresponding to the location in the geographic region of interest, and can provide characteristic information in the graphical virtual environment based on the associated characteristic data. In the example of FIG. 8, the universal data model provides an alarm indicator 372 to provide an indication of imminent danger, or to signify that the obstacle 366 can be or is a hostile threat. Such alarm indicator 372 can be accompanied by audio indications, as well, as provided via the universal data model. Additionally, the universal data model can provide a graphical indication of an effective range of the obstacle 366, demonstrated as a dashed radial border 374 around the obstacle 366, such as an effective weapon range defined by the characteristic data of the obstacle type corresponding to the obstacle 366. As an example, the effective range can be modified by environmental factors (e.g., as provided via the environment data 116), such as limitations to visibility resulting from weather (e.g., fog, rain, etc.). Therefore, as described previously, the flight-path 358 can be changed or can have been changed in response to the addition of the obstacle 366 to the graphical virtual environment to substantially mitigate the threat to the aircraft 356.

The diagram 350 in the example of FIG. 8 thus demonstrates an example of mission status data and the graphical representation of the real-time interaction of the mission assets, obstacles, environment, and control inputs of a given mission. Accordingly, the diagram 350 provides a graphical demonstration of the operation of the universal data model, and how the visual abstraction of the inputs to the federated system manager can be provided as outputs for monitoring the status of the mission in real-time.

FIG. 9 illustrates an example diagram 400 of a list of API calls and corresponding adapter commands provided to instantiate API calls with the universal data model 32. In particular, FIG. 9 illustrates an example of the list of API calls provided by the asset adapters 24, such as with respect to a set of exemplary mission assets (e.g., the mission assets 52 in the example of FIG. 2). In the example of FIG. 9, the diagram 400 demonstrates high level data model mapping between various UAS standards and the universal data model 32, as well as examples of respective middleware technologies. Particularly, the diagram 400 demonstrates a platform corresponding to the type of mission asset; a name of the mission asset as provided, for example, in a simulation; a VAL data type; a point-of-view (POV) of the data flow to and/or from the respective mission asset; a message type provided to and/or from the mission asset (e.g., via the receptive mission asset controller 24); a data rate of the communications to and/or from the respective mission asset; the periodicity of the communications to and/or from the respective mission asset; the UAS communication standard of the communications to and/or from the respective mission asset; and a middleware technology/data stack associated with the communications to and/or from the respective mission asset. The diagram 400 is provided as but one example to demonstrate mapping communications between exemplary mission assets using exemplary communications protocols. Therefore, it is to be understood that any of variety of different ways can be implemented for mapping exemplary mission asset communications to the universal data model 32.

In view of the foregoing structural and functional features described above, a methodology in accordance with various aspects of the present invention will be better appreciated with reference to FIG. 10. While, for purposes of simplicity of explanation, the methodology of FIG. 10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates an example of a method 450 for managing a mission associated with a federated system. At 452, situational awareness data received via a plurality of asset adapters (e.g., the asset adapters 24) associated with a respective plurality of mission assets (e.g., the mission assets 14) in a geographic region of interest is converted into a central data format. At 454, geographic map data associated with the geographic region of interest and provided via a geospatial map software program (e.g., the map software 114) is converted into a graphical virtual environment in the central data format via a map adapter (e.g., the map adapters 108). At 456, a universal data model (e.g., the universal data model 32) is maintained in the central data format in a data model repository (e.g., the data model repository 30) in response to the situational awareness data. The universal data model can include real-time interactive states of the plurality of mission assets in response to the situational awareness data. At 458, a real-time three-dimensional graphical rendering is generated via a plug-in graphics framework (e.g., the plug-in graphics framework 120). The real-time three-dimensional graphical rendering includes interaction of the plurality of mission assets with the graphical virtual environment based on the universal data model.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A federated system manager comprising:
    a plurality of asset adapters configured to receive situational awareness data from a respective plurality of mission assets comprising at least one airborne mission asset, the plurality of asset adapters further being configured to convert respective situational awareness data in a first data format to a common data format, the situational awareness data comprising data associated with a status, a location, a previously unidentified obstacle identified by the at least one airborne mission asset or another mission asset, a type of unidentified obstacle identified by the at least one airborne mission asset or the other mission asset, and a location for the unidentified obstacle;
    a plurality of mission constraint adapters configured to receive mission constraint data associated with real-time mission constraints from a respective plurality of mission constraint databases and to convert the mission constraint data in a second data format to the common data format;
    at least one mission control adapter configured to receive mission control data from a respective at least one mission control station to convert the mission control data from a third data format to the common data format and to provide mission status data to the at least one mission control station for real-time control of a mission for the airborne asset; and
    a data model repository configured to maintain a universal data model in the common data format, the universal data model being configured to track real-time interactive states of the plurality of mission assets, the real-time mission constraints, and the mission control data, the data model repository being further configured to provide the mission status data in real-time based on the universal data model, wherein the universal data model provides a graphical representation for the mission, the graphical representation comprising a graphical element for each of the airborne mission asset, the unidentified obstacle, and a graphical flight path representative of a flight path of the airborne mission asset to a mission objective, wherein the graphical flight path for the airborne mission asset is adjusted, corresponding to adjusting the flight path of the airborne mission asset to the mission objective, to avoid an effective range of the unidentified obstacle based on the type of unidentified obstacle identified by the at least one airborne mission asset or the other mission asset.

2. The manager of claim 1, wherein the data model repository comprises a plug-in graphics framework configured to enable the mission status data to be provided in a graphical manner within a graphical virtual environment associated with a geographic region of interest based respectively on the situational awareness data, the mission constraint data, and the mission control data for display of the graphical virtual environment on a user interface device associated with the at least one mission control station.

3. The manager of claim 2, wherein the at least one mission control adapter comprises a three-dimensional graphical rendering adapter configured to provide the mission status data comprising a real-time graphical rendering of the interactive states of the plurality of mission assets, the real-time mission constraints, and the mission control data within a graphical virtual environment.

4. The manager of claim 3, further comprising a graphics library configured to maintain a plurality of predetermined modeled graphical elements that are associated with respective application-specific graphical elements corresponding to the plurality of mission assets, the real-time mission constraints, and the mission control data, such that the three-dimensional graphical rendering adapter is configured to provide the mission status data comprising the real-time graphical rendering of the interactive states of the respective application-specific graphical elements within the graphical virtual environment.

5. The manager of claim 4, wherein the graphics library comprises:
    a graphical asset library comprising a plurality of predetermined modeled graphical asset elements that are associated with the respective plurality of mission assets and graphical characteristic data associated with the plurality of mission assets; and
    a graphical obstacle library comprising a plurality of predetermined modeled graphical obstacle elements that are associated with a respective plurality of mission obstacles and graphical characteristic data associated with the plurality of mission obstacles.

6. The manager of claim 2, wherein the at least one mission control adapter comprises a map adapter configured to facilitate interface of the universal data model with a geospatial map software program configured to provide the graphical virtual environment, such that the map adapter can convert the real-time interactive states of the plurality of mission assets, the real-time mission constraints, and the mission control data from the common data format as graphical elements in the graphical virtual environment of the geospatial map software program.

7. The manager of claim 2, wherein the at least one mission control adapter comprises a control input adapter configured to receive the mission control data from the user interface device to convert the mission control data from a communication protocol into the common data format to control the real-time interactive states of the plurality of mission assets and to convert the mission status data to the communication protocol to provide graphical changes to the mission status data associated with the real-time interactive states of the plurality of mission assets effected via the mission control data in the graphical virtual environment for display on the user interface device.

8. The manager of claim 1, further comprising a communications adapter that is configured to convert a plurality of communication protocols associated with a network to the common data format to provide access of the data model repository to the network to facilitate at least one of control and status monitoring communications between a plurality of user interface devices and the data model repository via the network.

9. The manager of claim 1, wherein the plurality of asset adapters are configured to receive the situational awareness data from the respective plurality of mission assets via respective data formats associated with mission planning/command and control interfaces, and to convert the respective first data format associated with the situational awareness data into the common data format.

10. The manager of claim 1, wherein the at least one mission control adapter comprises a simulation input adapter configured to convert simulation vector inputs provided from a simulation interface associated with the at least one mission control station from a fourth data format to the common data format, wherein the simulation vector inputs comprise simulated mission assets and simulated mission constraints that are maintained in the universal data model, wherein the data model repository is configured to calculate real-time interactive states of the simulated mission assets and the simulated mission constraints relative to the mission control data in real-time, and to provide the mission status data in response to the interactive states of the simulated mission assets and the simulated mission constraints relative to the mission control data.

11. A computer-readable medium comprising a program that, when executed, is configured to implement a method for managing a mission associated with a federated system, the method comprising:
  converting situational awareness data received via a plurality of asset adapters associated with a respective plurality of mission assets comprising at least one airborne mission asset in a geographic region of interest from a first data format to a common data format, the situational awareness data comprising data associated with a status, a location, a previously unidentified obstacle identified by the at least one airborne mission asset or another mission asset, a type of unidentified obstacle identified by the at least one airborne mission asset or the other mission asset, and a location for the unidentified obstacle;
  converting geographic map data associated with the geographic region of interest and provided via a geospatial map software program from a second data format to a graphical virtual environment in the common data format via a map adapter;
  maintaining a universal data model in the common data format in a data model repository in response to the situational awareness data, the universal data model comprising real-time interactive states of the plurality of mission assets in response to the situational awareness data;
  generating a real-time three-dimensional graphical rendering via a plug-in graphics framework, the real-time three-dimensional graphical rendering comprising interaction of the plurality of mission assets with the graphical virtual environment based on the universal data model:
  generating a graphical representation for the mission by the universal data model, the graphical representation comprising a graphical element for each of the airborne mission airborne mission asset to a mission objective; and
  adjusting the graphical flight path for the airborne mission asset corresponding to adjusting the flight path of the airborne mission asset to the mission objective to avoid an effective range of the unidentified obstacle based on the type of unidentified obstacle identified by the at least one airborne mission asset or the other mission asset.

12. The computer-readable medium of claim 11, the method further comprising converting mission control data that provided from at least one mission control station and which is associated with controlling the plurality of mission assets from a third data format to the common data format via a control input adapter, wherein maintaining the universal data model comprises maintaining the universal data model in the common data format in response to the situational awareness data and the mission control data, such that the universal data model comprises real-time interactive states of the plurality of mission assets in response to the situational awareness data and the mission control data.

13. The computer-readable medium of claim 11, the method further comprising converting the real-time three-dimensional graphical rendering from the common data format to a format associated with the geospatial map software program via a three-dimensional rendering adapter for display of the real-time three-dimensional graphical rendering via at least one user interface device.

14. The computer-readable medium of claim 11, the method further comprising maintaining a graphics library configured to maintain a plurality of predetermined modeled graphical elements that are associated with respective application-specific graphical elements corresponding to the plurality of mission assets and real-time mission constraints, wherein generating the real-time three-dimensional graphical rendering comprises generating the real-time three-dimensional graphical rendering comprising the application-specific graphical elements in the graphical virtual environment.

15. The computer-readable medium of claim 11, the method further comprising converting a plurality of communication protocols associated with a network to the common data format to provide access of the data model repository to the network to facilitate at least one of control and status monitoring communications between a plurality of user interface devices and the data model repository via the network.

16. The computer-readable medium of claim 11, the method further comprising:
  converting simulation vector inputs provided from a simulation interface from a third data format to the common data format, wherein the simulation vector inputs comprise simulated mission assets and simulated mission constraints that are maintained in the universal data model; and
  calculating real-time interactive states of the simulated mission assets and the simulated mission constraints relative to mission control data in real-time, wherein generating the real-time three-dimensional graphical rendering comprises generating the real-time three-dimensional graphical rendering comprising real-time interactive states of the simulated mission assets and the simulated mission constraints relative to mission control data in the graphical virtual environment.

17. A federated system manager comprising:
  a plurality of asset adapters configured to receive situational awareness data via respective data formats associated with mission planning/command and control interfaces from a respective plurality of mission assets comprising at least one airborne mission asset, the plurality of asset adapters being configured to convert the respective data formats associated with the situational awareness data in a first data format to a common data format, the situational awareness data comprising data associated with a status, a location, a previously unidentified obstacle identified by the at least one airborne mission asset or another mission asset, and a location for the unidentified obstacle;
  a plurality of mission constraint adapters configured to receive mission constraint data associated with real-time mission constraints from a respective plurality of mission constraint databases and to convert the mission constraint data in a second data format to the common data format;
  at least one mission control adapter configured to receive mission control data from a respective at least one mission control station to convert the mission control data from a third data format to the common data format and to provide mission status data to the at least one mission control station for real-time control of a mission for the at least one airborne asset;
  a data model repository configured to maintain a universal data model in a graphical manner within a graphical virtual environment associated with a geographic region of interest in the common data format based respectively on the situational awareness data, the mission constraint data, and the mission control data, the universal data model comprising real-time interactive states of the plurality of mission assets, the real-time mission constraints, and the mission control data, the data model repository being further configured to provide the mission status data as the real-time interactive states in the graphical virtual environment based on the universal data model, wherein the universal data model provides a graphical representation for the mission, the graphical representation comprising a graphical element for each of the airborne mission asset, the unidentified obstacle, and a graphical flight path representative of a flight path of the airborne mission asset to a mission objective, wherein the graphical flight path for the airborne mission asset is adjusted, corresponding to adjusting the flight path of the airborne mission asset to the mission objective, to avoid an effective range of the unidentified obstacle based on the type of unidentified obstacle identified by the at least one airborne mission asset and the other mission asset; and a communications adapter that is configured to convert a plurality of communication protocols associated with a network to the common data format to provide access to the network to facilitate at least one of the control data and the mission status data between a plurality of user interface devices and the data model repository via the network.

18. The manager of claim 17, wherein the at least one mission control adapter comprises a three-dimensional graphical rendering adapter configured to provide the mission status data comprising a real-time graphical rendering of the interactive states of the plurality of mission assets, the real-time mission constraints, and the mission control data within a graphical virtual environment.

19. The manager of claim 17, wherein the at least one mission control adapter comprises a map adapter configured to facilitate interface of the universal data model with a geospatial map software program configured to provide the graphical virtual environment, such that the map adapter can convert the real-time interactive states of the plurality of mission assets, the real-time mission constraints, and the mission control data from the common format as graphical elements in the graphical virtual environment of the geospatial map software program.

20. The manager of claim 17, wherein the at least one mission control adapter comprises a simulation input adapter configured to convert simulation vector inputs provided from a simulation interface associated with the at least one mission control station from a fourth data format to the common data format, wherein the simulation vector inputs comprise simulated mission assets and simulated mission constraints that are maintained in the universal data model, wherein the data model repository is configured to calculate real-time interactive states of the simulated mission assets and the simulated mission constraints relative to the mission control data in real-time, and to provide the mission status data in response to the interactive states of the simulated mission assets and the simulated mission constraints relative to the mission control data.

* * * * *